March 21, 1961  J. CHERUBIM  2,976,087
VARIABLE PRESSURE ORIFICE
Filed Jan. 26, 1959
FIG. 2
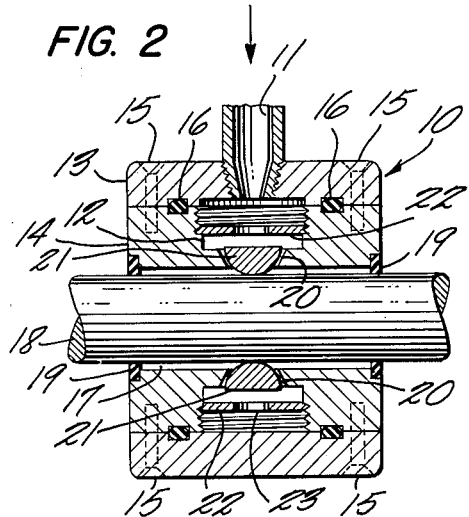
FIG. 1
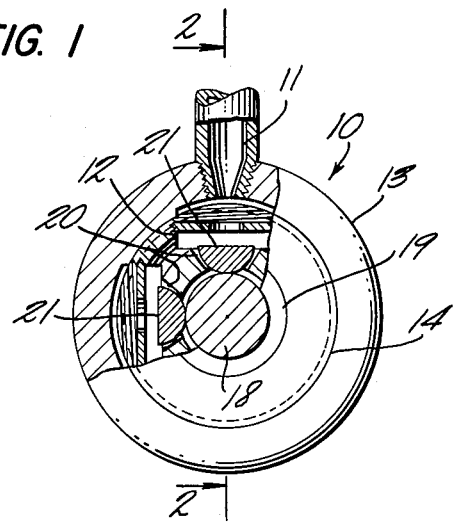
FIG. 3
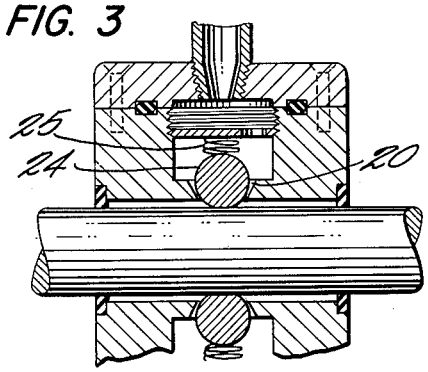
FIG. 4
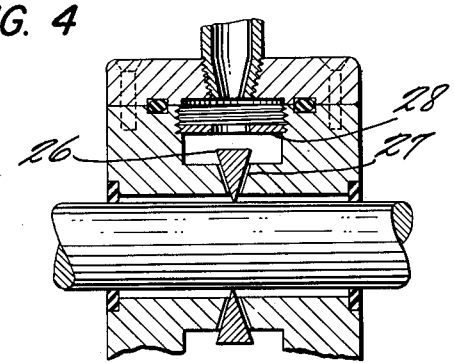
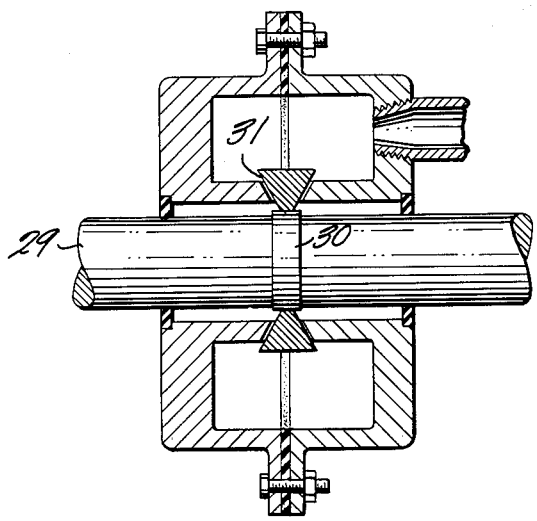
FIG. 5
INVENTOR.
JUSTIN CHERUBIM
BY
his   ATTORNEYS United States Patent Office 2,976,087
Patented Mar. 21, 1961

2,976,087

VARIABLE PRESSURE ORIFICE

Justin Cherubim, Wyandanch, N.Y., assignor to Fairchild Engine and Airplane Corporation, Hagerstown, Md., a corporation of Maryland Filed Jan. 26, 1959, Ser. No. 788,825

10 Claims. (Cl. 308—122)

This invention relates to a hydrostatic bearing for supporting a shaft, and more particularly, to a means for varying the fluid pressure at various points around the periphery of the shaft being supported in order to maintain the shaft centered in the bearing.

Hydrostatic bearings provide a low friction support for shafts and the like by supporting the shafts on a layer of fluid under pressure. The bearings generally comprise a housing surrounding the shaft, means in the housing to direct a fluid under pressure against the shaft, and means to control the pressure of the fluid at various points around the shaft to maintain the shaft clear of all friction producing surfaces. One failing of such bearings in the past has been the fact that it has been difficult to make full use of the pressure available to support a load. In order to resist or support a load, some throttling of the fluid pressure must take place in or before the bearing clearance. Throttling signifies an irretrievable loss of pressure. This invention does not completely eliminate the pressure loss but reduces it substantially. Mechanisms employed in the past to readjust the fluid pressure have tended to be complex and usually have been unable to react to changes in the load rapidly enough to prevent damage to the bearing and the shaft.

It is therefore an object of this invention to provide a hydrostatic bearing having a means to automatically adjust the fluid pressure around the periphery of the shaft being supported in accordance with the load and which is reliable and simple in operation and will react almost instantaneously to a change in the load.

These and other advantages are attained by providing a hydrostatic bearing constructed according to the invention comprising a housing adapted to receive the shaft to be supported, a plurality of feed holes in the housing through which fluid pressure is applied to the shaft, and a plurality of plungers positioned in the feed holes in contact with the shaft being supported. The feed holes act as valve seats and the plungers act as valves or wedges that follow the position of the shaft. Since the shaft is in contact with the plungers, the position of the shaft determines the clearance between the plungers and the sides of the feed holes, which clearance determines the effective sizes of the feed holes and therefore the fluid pressure on the shaft in the vicinity of each of the feed holes.

In this manner, a self-adjusting hydrostatic bearing is provided which automatically and reliably adjusts the fluid pressure in the vicinity of each of the feed holes by adjusting the positions of the plungers in the feed holes in response to a change in the position of the shaft. Since the plungers are always in contact with the shaft there is a nearly instantaneous reaction which makes the apparatus capable of highly effective operation as a hydrostatic bearing.

This invention may be better understood from the following detailed description taken in conjunction with the accompanying figures of the drawings, in which:

Figure 1 is a transverse view partially in section showing a hydrostatic bearing constructed according to the invention;

Figure 2 is a view taken along the line 2—2 of Figure 1;

Figure 3 is a view in section showing another embodiment of the invention;

Figure 4 is a view in section showing a further embodiment of the invention; and Figure 5 is a view in section showing a still further embodiment of the invention.

The structure illustrated in Figures 1 and 2 is representative of one embodiment of the invention. This structure includes a housing 10 having a fluid inlet 11 communicating with an annular fluid passageway 12 in the housing. The housing 10 is made up of outer and inner sections 13 and 14 fastened together by a plurality of screws 15. Two ring gaskets 16 positioned in channels between the two sections provide a fluid-tight seal. A cylindrical borehole 17, adapted to receive a shaft 18, extends through the housing and has a packing ring 19 at each end.

A plurality of feed holes 20 provide passageways between cylindrical borehole 17 and the annular fluid passageway 12 at a series of points around the circumference of the shaft 18. Into each feed hole 20 is inserted a plunger 21 which is tapered to approximately the same dimensions as the feed hole. A disc-shaped retainer 22 having a central aperture 23 is threaded into the fluid passageway behind each of the plungers 21.

In operation, the bearing is fitted around a shaft as shown in Figures 1 and 2 and a source of pressurized fluid is connected to the fluid inlet 11. The fluid enters the annular fluid passageway 12 and flows through the feed holes 20 into the space between the shaft 18 and the housing 10. The plungers 21 of this embodiment of the invention are constructed in the shape of a hemisphere of such size that the bottom portions rest on the shaft when the fluid pressure on the flat sides of the plungers forces them downward. The sides of the feed holes 20 are tapered and the plungers 21 are large enough so that, when the shaft 18 is centered with respect to the housing 10 and the plungers are resting on the shaft, there will be a clearance between the plungers 21 and the sides of the feed holes 20. Since the plungers are forced into contact with the shaft, the position of the shaft will determine the positions of the plungers in the feed holes and, therefore, the effective sizes of the feed holes. The retainers 22 prevent the plungers from coming out of the feed holes when the hydrostatic pressure drops.

If the load is increased on the top side of the shaft 18, it will be forced downward and the upper plunger will follow it so that the effective size of the feed hole decreases and the fluid pressure in that area drops. At the same time the lower plunger will be forced out of the lower feed hole which increases the pressure on the bottom side of the shaft. Since the pressure is decreased on the top of the shaft and increased on the bottom, the shaft will automatically rise until the forces acting on the shaft are again in equilibrium.

The bearing illustrated in Figure 3 differs from the bearing illustrated in Figures 1 and 2 in the shape of the plungers and the means employed to maintain the plungers in contact with the shaft. The plungers 24 are spherical rather than hemispherical and are held in the feed holes against the shaft by compression springs 25. The operation of this embodiment is similar to that previously discussed.

The structure illustrated in Figure 4 includes a plurality of wedge-shaped plungers 26 and tapered feed holes 27. The hydrostatic pressure on the top of each plunger maintains the plungers in contact with the shaft and a plurality of retainers 28 prevent the plungers from falling out. Again the operation is similar to that already discussed.

In the embodiment of the invention illustrated in Figure 5, the plunger 31 is fastened to the shaft 29 instead of being held in contact with the shaft by hydrostatic pressure or by a spring. A band 30 is attached to the shaft 29 in such a manner that the shaft 29 can rotate or move longitudinally while the band 30 remains stationary. The plungers 31 are fastened to the band and change the effective sizes of the feed holes in response to a change in the position of the shaft.

It will be understood therefore that a novel and useful hydrostatic bearing has been provided. The low friction support provides a unique means of maintaining the shaft centered in the bearing away from all friction producing surfaces which will react almost instantaneously to a change in the load and which is simple to construct and reliable in operation.

While particular embodiments of the present invention have been shown and described for purposes of illustration, it is apparent that changes and modifications may be made without departing from this invention in its broader aspects. Therefore the invention described herein is not to be construed as limited to the specific embodiments described but is intended to encompass all modifications coming within the scope of the following claims.

I claim:

1. A self-adjusting hydrostatic bearing comprising a housing having a substantially cylindrical borehole adapted to receive a shaft to be supported, a plurality of feed holes formed in said housing leading to said borehole, a plurality of conduits in said housing in communication with said feed holes and adapted to be connected to a source of high pressure fluid, said feed holes acting as valve seats and being positioned in said housing so that the direction of flow through them is toward the axis of the borehole, and a plurality of plungers positioned in said feed holes and having a portion that extends into said borehole, each of said feed holes and said plungers acting as a variable valve that varies the output fluid pressure in response to a change in the position of said plunger in the feed hole.

2. A hydrostatic bearing comprising a housing having a substantially cylindrical borehole adapted to receive a shaft to be supported, a fluid passageway in said housing adapted to be connected to a source of high pressure fluid, a plurality of feed holes formed in said housing in communication with said passageway and leading to said bore hole in such a manner that the direction of flow through them is toward the axis of said borehole, a plunger disposed in each of said feed holes with a portion extending into said borehole so that, when a shaft is inserted into said borehole, it will be in contact with said plungers and will determine the positions of said plungers in said feed holes and thereby determine the fluid pressure in the vicinity of each of said feed holes when a source of high pressure fluid is connected to said passageway.

3. A hydrostatic bearing comprising a housing having a substantially cylindrical borehole adapted to receive a shaft, a fluid passageway in said housing adapted to be connected to a source of high pressure fluid, a plurality of tapered feed holes formed in said housing in communication with said passageway and leading to said borehole in such a manner that the direction of flow through them is toward the axis of said borehole, a plunger disposed in each of said feed holes with a portion extending into said borehole, said plungers being made larger than said feed holes and providing a wedging action when forced into said feed holes, and means for forcing said plungers into said feed holes so that, when a shaft is inserted into said borehole the plungers will be in contact with the shaft and the position of the shaft will determine the positions of the said plungers in the said feed holes and thereby determine the fluid pressure on the shaft in the vicinity of each of said feed holes when a source of high pressure fluid is connected to said passageway.

4. A hydrostatic bearing as in claim 3 wherein said plungers are hemispherical in shape and the means for forcing said plungers into said feed holes is the hydrostatic pressure on the flat sides of said plungers.

5. A hydrostatic bearing as in claim 3 wherein said plungers are spherical in shape and said means for forcing said plungers into said feed holes is a plurality of compression springs, one of said springs being disposed between each of said plungers and said housing.

6. A hydrostatic bearing as in claim 3 wherein said plungers are wedge-shaped and said means for forcing said plungers into said feed holes is the hydrostatic pressure on the top side of said wedge-shaped plungers.

7. A hydrostatic bearing as in claim 3 wherein said means for forcing said plungers into said feed holes comprises an annular band that is disposed in said borehole and is attached to the portion of each of said plungers that extends into said borehole.

8. A hydrostatic bearing as in claim 3 wherein said means for forcing said plungers into said feed holes comprises a plurality of compression springs, one of said springs being disposed between each of said plungers and said housing.

9. A bearing adapted to support a shaft comprising a housing having a substantially cylindrical borehole formed therein, a shaft disposed in said borehole, a plurality of feed holes formed in said housing in communication with said borehole and adapted to be connected to a source of high pressure fluid, said feed holes being positioned so that the direction of flow through them is toward the axis of said borehole, and a plunger positioned in each of said feed holes with a portion extending into said borehole, said portion of each of said plungers that extends into said borehole being maintained in contact with said shaft.

10. A bearing adapted to support a shaft comprising a housing having a substantially cylindrical borehole formed therein, a shaft disposed in said borehole, a fluid passageway formed in said housing adapted to be connected to a source of high pressure fluid, a plurality of tapered feed holes formed in said housing in communication with said passageway and leading to said borehole, said feed holes being formed such that the direction of flow through them is toward the axis of said borehole, a plunger disposed in each of said feed holes with a portion thereof extending into said borehole, said plungers being made larger than said feed holes and providing a wedging action when forced into said feed holes, and means for forcing said plungers into said feed holes and into contact with said shaft.

References Cited in the file of this patent

UNITED STATES PATENTS 303,813  Cousins _____ Aug. 19, 1884

FOREIGN PATENTS 548,363  Great Britain _____ Oct. 7, 1942